United States Patent [19]

Pinkas

[11] Patent Number: 5,926,549

[45] Date of Patent: Jul. 20, 1999

[54] PROCESS FOR VERIFYING THE PRESERVATION OF THE INTEGRITY OF AN UNPROTECTED REQUEST SENT BY A CLIENT TO A SERVER BY VERIFYING THE INTEGRITY OF THE RESPONSE

[75] Inventor: Denis Pinkas, Chaville, France

[73] Assignee: Bull S.A., Chaville, France

[21] Appl. No.: 08/799,629

[22] Filed: Feb. 12, 1997

[51] Int. Cl.[6] .............................. H04K 1/00; H04L 9/00; G06F 7/04; G07D 7/00

[52] U.S. Cl. ................................. 380/25; 380/23; 380/49; 395/188.01; 340/825.3; 340/825.31; 340/825.34

[58] Field of Search .................................. 380/23, 24, 25, 380/49; 340/825.3, 825.31, 825.34; 395/186, 187.01, 188.01

[56] References Cited

U.S. PATENT DOCUMENTS

| | | | |
|---|---|---|---|
| 5,214,700 | 5/1993 | Pinkas et al. .............................. | 380/25 |
| 5,774,552 | 6/1998 | Grimmer ................................... | 380/25 |
| 5,841,871 | 11/1998 | Pinkas ....................................... | 380/25 |

OTHER PUBLICATIONS

IEEE Journal On Selected Areas In Communication, vol. 7, No. 4, May 1989, New York, US, pp. 505–516 XP000007991, N. Nakao et al.: "Proposal on a Secure Communications Service Element (SCSE) In The OSI Application Layer" Paragraph III.B, Paragraph III.C.

IEEE Journal On Selected Areas In Communication, vol. 7, No. 4, May 1989, New York, US, XP000007972, pp. 517–524 C. Mitchell et al.: "CCITT/ISO Standards For Secure Message Handling", Paragraph II.A, Paragraph IV.B.

*Primary Examiner*—Gail O. Hayes
*Assistant Examiner*—Hrayr A. Sayadian
*Attorney, Agent, or Firm*—Kerkam, Stowell, Kondracki & Clarke, P.C.; Edward J. Kondracki

[57] ABSTRACT

The present invention relates to a process for verifying the preservation of the integrity of an unprotected request sent by an anonymous client to a server, in which only one public key, that of the server, is used. This process is remarkable in that the anonymous client sends, along with his request, a flag which specifies whether or not the server must offer an absolute guarantee of non-repetition of the requests received as well as a unique number, that is, a number which never repeats or has a low probability of repetition, consisting either of a random number with a low probability of repetition or the concatenation of a time indicator and a random number with a certainty of non-repetition, the verification of said integrity being performed during the reception of the response to the request, for which reason the global response includes the response to the request plus the result of a one-way compression function applied to the request, flag and unique number combination, the integrity of the global response moreover being protected either by means of the public key of the server used as a signature key, or by means of a private key established using the public key of the server as an encryption key.

14 Claims, No Drawings

PROCESS FOR VERIFYING THE PRESERVATION OF THE INTEGRITY OF AN UNPROTECTED REQUEST SENT BY A CLIENT TO A SERVER BY VERIFYING THE INTEGRITY OF THE RESPONSE

CROSS REFERENCE TO RELATED APPLICATION

The subject matter of this application is related to application Ser. No. 08/751,740 filed on Nov. 18, 1996, now U.S. Pat. No. 5,841,871, in the name of Denis Pinkas for Method For Authenticating A User Working In A Distributed Environment In The Client/Server Mode and assigned to the assignee of the present invention.

FIELD OF THE INVENTION

The present invention relates to a process for verifying the preservation of the integrity of an unprotected request sent by a client to a server, in which only one signature key, that of the server, is used.

DESCRIPTION OF RELATED ART

A client-server model is an asymmetric data processing model constituted by two separate logical entities, one of which, the client, operates in the foreground, while the other, the server, works in the "background," which two entities act in cooperation. Thus, the client sends requests in order to obtain information or actions which the server can execute more specifically or under better conditions, and the server then responds to the requests sent by the client. Generally, the server executes only cumbersome and specialized tasks common to a plurality of clients, which can require greater processing power, which involve data common to a plurality of clients and which require single control.

In this context, in data processing and particularly in the complex networks of distributed systems, it is necessary to plan and organize services which make it possible to ensure the security of the distributed environment. In effect, the use of open-systems, distributed data processing offers enormous advantages since it enables a client, that is, the user of an interface, to access the various data in such systems, whatever the geographical location of the user and whatever the system in which the data resides. However, while the user wishes to benefit from these advantages, he also wants certain data considered to be confidential or critical to be protected so that only certain users are authorized to access it, just as he wants any ill-timed modification of the stored data or any detection of the transmitted data to be prevented, so that he can use the data received in complete confidence, its integrity having been preserved. In practice, security services, particularly in distributed data processing, are composed of functions which complement those furnished by the individual platforms or applications such as the access control, audit, integrity and source authentication of the data involved in the requests and responses of the users.

For this reason, various mechanisms, for example the code MAC (Message Authentication Code), can be used to guarantee integrity during the data exchanges which occur in the network. Normally, when it is desirable to ensure the protection of the integrity of a request, a key is used which can either be a signature key which makes it possible to produce a so-called "digital" signature, or a marking key which makes it possible to produce a mark. The purpose of the "digital" signature is to clearly identify the signatory user while preventing any alteration or counterfeiting of the transmitted data. This signature must be persistent, that is, it is set not just for the duration of a single connection, but for the life of a document. The marking key is used to produce a mark which affirms that the data received has not been subject to any accidental or intentional modification.

Thus, for example, when a client A sends a request to a server B, this request is signed and hence its integrity is protected by means of a signature key belonging to the client A, while the response of the server B is protected by means of a signature key belonging to the server B; A and B must therefore each possess at least one signature key. A first drawback of this technique is inherent in the fact that a client does not always possess such a key or that in certain cases its utilization is excessively cumbersome. In fact, using a direct integrity protection technique on the request, such as for example a digital signature, can prove tedious in certain cases, since the calculation of such a signature takes a significantly long time, which constitutes a second drawback.

SUMMARY OF THE INVENTION

The object of the present invention is to eliminate the various drawbacks which in certain cases are inherent in the utilization of the known integrity protection techniques of the prior art, and to propose a process in which only one public key is used, namely that of the server, which enables a client who is not equipped with or does not wish to use his own key to verify that the integrity of a request he has sent has been preserved, in a way that is easy and efficient and takes less time.

For this reason, the process for verifying the preservation of the integrity of an unprotected request sent by a client to a server as mentioned in the preamble is remarkable in that the client sends, along with his request, a flag which specifies whether or not the server must offer a guarantee of non-repetition, as well as a unique number, that is, one which never repeats or has a low probability of repetition (for example on the order of $2^{-64}$), consisting either of a random number with a low probability of repetition or of the concatenation of a time indicator and a random number with a certainty of non-repetition, and in that the verification of the integrity takes place during the reception of the response to the request (and not during the reception of the request), for which reason the global response includes the response to the request plus the result of a one-way compression function applied to the request, flag and unique number combination (known as the "message digest"), the integrity of which global response is moreover protected by means of the key of the server.

Thus, according to the concept of the invention and thanks to the technique used, only one key, that of the server, is necessary to enable an anonymous client to ensure that a request he has sent has not been modified in transit, and to be informed if this has been the case, and the fact that the server receiving the request is unable to verify that this request has not been modified has no importance in the context of a request sent by an anonymous client. This process, which is simple to use, is moreover efficient and fast relative to the techniques of the prior art since obviously, performing a calculation by applying the one-way compression function to the request which includes the flag and the unique number is an operation which is considerably shorter than that which consists of performing the calculation of a digital signature. It is known that one-way compression functions, called "hash functions" by one skilled in the art, currently use the algorithms MD4 ("Message Digest algorithm"), MD5 or even SHA ("Secure Hash Algorithm"). Moreover, the utilization of a unique number which includes a time indicator and a random number makes it possible to offer certain protection against any attempted "replay" on the part of an intruder trying to pass himself off to the client as the authentic server. A "replay" or "replay attack" (as it is also known to one skilled in the art) is an attack which is said to be active, that is based on a fraudulent insertion of data, after a capture in the network subsequent to a "listen."

The key of the server which makes it possible to protect the integrity of the global response can be obtained in various ways. The present invention covers two preferred variants, according to which the server makes use of a signature key or an encryption key.

DESCRIPTION OF THE PREFERRED EMBODIMENTS

According to the first variant, the global response is characteristically signed using the private signature key of the server, which key is verified by the client upon reception of the global response using the public signature key of the server.

Also characteristically, according to the second variant, during the sending of the request, the flag and the unique number, an additional piece of data is added, which piece of data contains a marking key encrypted by the public encryption key of the server, which marking key can be decrypted by the server using the corresponding private decryption key and is therefore used by the server to mark the global response, with the client then verifying this mark upon reception of the global response.

It is worth noting that in the case of the second variant, the additional piece of data added to the request, flag and unique number can be reused identically for a large number of requests, not just for one request. In fact, the client only has to effect the encryption of the marking key with the public key of the server once, since he can locally store the result of the encryption of the associated marking key and can reuse these values as many times as necessary. This makes it possible to increase the performance of the system on the client end. As for the server, it may or may not store the result of the decryption. If this result is stored, the decryption operation performed by the server can be omitted, except during the first reception of a new marking key. In effect, it suffices to manage a table which associates the additional data received with each value of the associated marking key obtained during the decryption of the first message containing this additional piece of data. If the additional piece of data received already appears in this table, then a simple reading will furnish the marking key to be used by the server. If the additional piece of data received does not already appear in this table, it can then be added and associated with the marking key obtained after the decryption. This makes it possible to increase the performance of the system on the server end. A system based on a "cache" memory which is either single, that is on the client end only, or double, that is on both the client and server ends, can also be used.

Characteristically, according to the process for verifying the preservation of the integrity of a sent request, when the client sends his request, he decides beforehand whether or not he wants the non-duplication of the unique number to be absolutely guaranteed by the server. To do this, he adds to his request the flag specifying whether or not the server must offer this guarantee as well as the unique number he has formed, then he performs a calculation applying the one-way compression function to the request, flag, and unique number combination, which calculation he stores locally. Then, when the server receives the request, if the client has specified that he wants to be absolutely sure that a "replay" is impossible, the server tests whether it can guarantee the non-duplication of the unique number. If it cannot do so, it indicates this with a different flag during the response; otherwise, it verifies that it has not yet received this unique number, or in the opposite case, performs a calculation applying the one-way compression function to the request, flag and unique number combination received and includes this calculation in its response, the integrity of the global response being protected by means of the key of the server. Finally, when the client receives this response, he first verifies whether the calculation he has stored effectively corresponds to the calculation sent by the server and if this is the case, he then verifies the digital signature or the mark according to the variant used. The preservation of the integrity of the request sent previously is determined when both the calculation and the integrity are verified. It must be noted that the order of the verification operations can technically be reversed; however, the order indicated here offers the best performance since the short calculations are performed first.

Thus, the client can easily be assured that his request has not been modified and that the response received actually corresponds to the request he sent as well as to the requested guarantee of protection from "replay", and therefore that this response cannot be the "replay" of a response sent previously by this same server, even for an identical request. Moreover, it is important here to insist on the fact that, in conformity with the concept of the process according to the invention, the client does not need any key of his own; he needs only the knowledge of one or more public keys.

For a better comprehension of the concept of the invention, the following description, which is understood to be non-limiting, will make it easy to understand the environment to which the invention applies and how it can be implemented. For this purpose, two practical applications which implement the technique taught by the invention are disclosed below.

The first application relates to a requesting user who, while not possessing any key and desiring to register his public key with an authority, wishes to obtain a guarantee that the key received by this authority for registration is indeed the one he has sent. In this application, it is necessary to equate the requester with the client and the key certification authority with the server. The object here is in fact to enable a new user or an installer, the requester, to install a public key which belongs to him and to make himself known to an authority, while ensuring that the key has reached this authority without alteration and moreover that the authority is guaranteed that this key has in fact been sent by the requester, without ever having to handle any secret information. According to the concept of the invention, the requester also knows the public key of the certification authority, and this knowledge offers him two possibilities: he can either verify a signature produced by the certification authority, or encrypt a piece of data for the certification authority and for this authority alone. Only the first variant in used in this example. The requester sends the certification authority his request, thus sending it his unprotected public key (which he wants to register), his identity (associated with this public key belonging to him), a flag (with a set value) and his unique number (preferably constituted by, but not limited to, 64 bits, for example the send date and a save time for the request in 32 bits as well as a random number in 32 bits). Next, the requester performs a calculation, applying a one-way compression function (the same one, MD4, MD5 or SHA, which will be used by the certification authority) to the entire request, a calculation which he stores locally. The certification authority receiving this request verifies that the unique number has not already been received, and if this is the case, then in response, it will acknowledge receipt of this request for registration and, for example, send a registration number affirming that the request has in fact been received as well as the result of the calculation performed by applying the one-way compression function to the global request received, all of which is signed with the private key of the certification authority. Upon receipt of this response, the requester verifies whether the calculation he has stored locally effectively corresponds to the calculation sent by the server and, if this is the case, since he has the public key of the certification authority, he then verifies the signature of this certification authority. If the calculation and the signature are verified, the requester is then assured that the integrity of the request sent previously has been preserved and that the certification authority has correctly received it and registered it with his identity under the registration number received.

At this point, the requester knows that his request has been registered without alteration by the certification authority and that the latter therefore knows the information relative to the public key and the identity of the requester. However, the certification authority has also registered the date at which the request was sent and the length of time for which it must save this request, and if nothing happens, the registered data will be deleted after this time. Therefore, before the time for saving the request has elapsed, the requester who has received and knows the registration number for example telephones the administrator of the certification authority and confirms, simply by providing his identity and the registration number received, in order to request the administrator for validation of the information received. Thus, this technique offers the clear advantage of simplicity, since the information which the requester confirms is simply the registration number communicated to him by the certification authority and his identity, not the value of the public key, which is complex and of necessity excessively long (generally several lines) and in which there is consequently a high probability that errors will occur during the transmission or reception of the information, for example during a telephone conversation. In order to perform a validation of the information received and therefore registered, the administrator need not type in even the slightest message; he need only click, using a mouse, on the registration number displayed on the screen which corresponds to the one that has just been communicated to him. Thus, in order to install a key, the data which circulate between the requester and the certification authority are, relative to any other method, very short and non-confidential. Moreover, the numbers used can be reused very quickly, as soon as the save time has elapsed, thus preventing the need to handle numbers which are too long.

The second application integrates particularly well into an object management system, also called an object manager by one skilled in the art, which uses a management protocol, for example the protocol SNMP (Simple Network Management Protocol). In this example of application, an SNMP manager sends a request to an SNMP agent in order to retrieve public information, which SNMP manager, however, wishes to ensure that the response returned by this SNMP agent actually corresponds to the command contained in the request he has sent. In this application, it is necessary to equate the SNMP manager with the client and the SNMP agent with the server. At this point, a few reminders will be presented succinctly which will make it possible to better understand the environment to which this application applies. An object manager is responsible for managing various data processing resources such as, for example, an information system, a network element, or simply a piece of application software. For this purpose, a dialogue is established across the network using a predetermined standard management protocol, by means of requests sent by the manager to the data processing resources and responses to these requests returned by the data processing resources in question to the management system. In order to authorize this dialogue, a data processing device which is specially equipped to facilitate the execution of this task is installed in each data processing resource. This device corresponds to the object manager in the equipment which supports the data processing resource to be managed. These devices are of different natures, depending on the object management model they support and the management protocol they use to communicate with the management system. In the present example, a device of this type corresponds to the SNMP agent described in the document "Simple Network Management Protocol-Internet Working Group Request for Comments 1157. May 1990", which uses the object model and the management protocol defined by the I.E.T.F. (Internet Engineering Task Force). More precisely, the SNMP agents support management objects standardized by the I.E.T.F. and/or so-called private objects, characterized by the suppliers of the resources to be managed (equipment manufacturers, software developers, etc.). The SNMP protocol used by the SNMP agents was designed to furnish only basic management means based on a limited management service which uses only four primitive functions (GET, SET, GET-NEXT, TRAP) and on a simple object model. Moreover, the function used most often (nearly 90% of the time) is the GET function which makes it possible to read, that is to retrieve, information from an SNMP agent. It is possible to distinguish between two types of controls performed during the application of a GET function by an agent: an access control which makes it possible to supply the information requested only to authorized requesters, or else the absence of control for access to public information. It is precisely this case to which this second advantageous application relates. Certain techniques require the signature of the manager during the sending of a request and the signature of the agent during the response to this request, which is absolutely essential for the utilization of a SET function, whereas with a GET function, by far the most commonly used, the present technique, which requires only one signature, is particularly well suited and represents a substantial gain in performance.

In this case, the idea is that the manager wants to ensure that the response received is in fact linked to his request, that it is actually the response from the agent addressed and not a "replay". Thus, in this second application, also according to one of the characteristics of the invention, the request which includes a flag and a unique number (preferably constituted by, but not limited to, 64 bits, for example the send date and a random number of 32 bits each), is sent without protection by the manager, while a calculation is then performed by applying a one-way compression function (the same one, MD4 or MD5, which will be used by the SNMP agent) to the entire request, a calculation which is stored locally. The agent receiving this request verifies that the unique number has not already been received, then if this is the case, sends in response the requested data associated with the request as well as the result of the calculation performed by applying the one-way compression function to the global request received, all of which is signed with its signature key. Upon receiving this response, the manager verifies whether the calculation he has stored locally effectively corresponds to the calculation sent by the agent, and if this is the case, since he has the public key of the agent, he then verifies the signature of the agent. If the calculation and the signature are verified, the manager is then assured that the integrity of the request sent previously has been preserved, that the agent has actually received it, and that this response is in fact the response expected, and not a "replay" of old data.

In conclusion, according to the concept of the invention and thanks to the technique used, only one signature, that of the server, is necessary to enable a client to ensure that a request he has sent has not been modified in transit and to be informed if that is not the case, without the server's necessarily knowing whether the information received has been modified. This technique is truly novel since normally it is the server which verifies the preservation of the integrity of the information and assures the client that this information has not been falsified. This process, which is simple to use, is moreover efficient and fast relative to the techniques of the prior art since obviously, to perform a calculation by applying a one-way compression function to a request which includes a flag and a unique number is an operation which is considerably shorter than that which consists of performing the calculation of a digital signature when a direct integrity mechanism is used on the request. While the modification of the sent request is easily detectable during the checking of the identity of the stored calculation against the calculation sent by the server, the falsification of the information during the transmission of the response can also be easily detected by the client upon receipt of this response due to the verification of the signature of the server. Moreover, the utilization of a unique number which includes a time indicator and a random number makes it possible to offer strong protection against any attempt at falsification, since the probability that two clients would accidentally choose the same number is infinitesimal, whereas in the present case in which this choice is deliberate, the probability is equal to one. While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

I claim:

1. A computer implemented process for verifying the preservation of the integrity of an unprotected request sent by a client to a server which provides a response to the request and in which a signature key of the server is used, comprising adding a flag to a request sent by the client to the server, the flag specifying whether or not the server must offer a guarantee of non-repetition, as well as a unique number which never repeats or has a low probability of repetition, consisting either of a random number with a low probability of repetition or of a concatenation of a time indicator and a random number with a certainty of non-repetition, verifying said integrity by the client during the reception of a global response to the request, the global response including the response to the request plus the result of a one-way compression function applied to the request, flag, and unique number combination, the integrity of the global response moreover being protected by means of the key of the server.

2. The process for verifying the preservation of the integrity of a sent request according to claim 1, characterized in that the signature key of the server is a private key used to sign the global response which private key, upon reception of the global response, is verified by the client using a public signature key of the server.

3. The process for verifying the preservation of the integrity of a sent request according to claim 2, further comprising deciding in advance when sending a request whether or not non-duplication of the unique number is to be absolutely guaranteed by the server and adding to the request the flag specifying whether or not the server must offer said guarantee as well as the unique number formed, then performing a calculation applying the one-way compression function to the request, flag, and unique number combination, storing the calculation locally, and when the server receives the request, if the client has indicated that the server is to guarantee non-repetition, said server tests whether it can guarantee the non-repetition of the unique number, and indicating with a different flag during the response if the guarantee of non-repetition cannot be given, otherwise the server verifies whether or not said unique number has already been received and then sends an error message if the unique number has already been received, or in the opposite case, performs a calculation applying the one-way compression function to the request, flag, and unique number combination received and includes this calculation in its response, the integrity of the global response being protected by means of the key of the server, whereas the client receiving this response first verifies whether the calculation he has stored effectively corresponds to the calculation sent by the server and if this is the case, then verifies the digital signature or the mark depending on the variant used, the preservation of the integrity of the request sent previously being determined when the calculation and the integrity are verified.

4. The process for verifying the preservation of the integrity of a sent request according to claim 3, used in the case of an application in which a client who does not possess any private key desires to register the client's public key and make the client known to a server acting as a key certification authority, characterized in that the client, with knowledge of the public key of the key certification authority, sends the certification authority an unprotected request constituted by the public key to be registered, his identity, a flag and a unique number, while performing a calculation applying a one-way compression function to the entire request, storing the calculation locally, and the certification authority, upon receiving said request and verifying that the unique number has not previously been received, acknowledging receipt of said registration request and sending in response a registration number for said request and the result of a calculation performed by applying the one-way compression function to the global request received, all of which is signed with a private key of the certification authority, the client upon receiving said response from the certification authority, verifying whether the calculation stored locally by the client effectively corresponds to the calculation sent by the server so as to verify the signature of said certification authority.

5. The process for verifying the preservation of the integrity of a sent request according to claim 3, characterized in that in an object management system using the protocol SNMP (Simple Network Management Protocol), the client is an SNMP manager and the server corresponds to an SNMP agent in order to retrieve public information while ensuring that the response returned by said SNMP agent in fact corresponds to the command contained in the request, which request includes a flag and a unique number and is sent by the SNMP manager without protection, while a calculation is then performed by applying a one-way compression function to the entire request, said calculation being stored locally, while the SNMP agent receiving the request verifies that the unique number has not already been received and upon said verification sends in response the requested information associated with the request as well as the result of the calculation performed by applying the one-way compression function to the global request received, signed with an SNMP agent signature key, then upon receiving said response, verifying by the manager whether the calculation stored locally effectively corresponds to the calculation sent by the SNMP agent and if upon verification, using the public key of the SNMP agent, verifying the signature of said SNMP agent.

6. The process for verifying the preservation of the integrity of a sent request according to claim 2, used in the case of an application in which a client who does not possess any private key desires to register the client's public key and make the client known to a server acting as a key certification authority, characterized in that the client, with knowledge of the public key of the key certification authority, sends the certification authority an unprotected request constituted by the public key to be registered, his identity, a flag and a unique number, while performing a calculation applying a one-way compression function to the entire request, storing the calculation locally, and the certification authority, upon receiving said request and verifying that the unique number has not previously been received, acknowledging receipt of said registration request and sending in response a registration number for said request and the result of a calculation performed by applying the one-way compression function to the global request received, all of which is signed with a private key of the certification authority, the client upon receiving said response from the certification authority, verifying whether the calculation stored locally by the client effectively corresponds to the calculation sent by the server so as to verify the signature of said certification authority.

7. The process for verifying the preservation of the integrity of a sent request according to claim 2, characterized in that in an object management system using the protocol SNMP (Simple Network Management Protocol), the client is an SNMP manager and the server corresponds to an SNMP agent in order to retrieve public information while ensuring that the response returned by said SNMP agent in fact corresponds to the command contained in the request, which request includes a flag and a unique number and is sent by the SNMP manager without protection, while a calculation is then performed by applying a one-way compression function to the entire request, said calculation being stored locally, while the SNMP agent receiving the request verifies that the unique number has not already been received and upon said verification sends in response the requested information associated with the request as well as the result of the calculation performed by applying the one-way compression function to the global request received, signed with an SNMP agent signature key, then upon receiving said response, verifying by the manager whether the calculation stored locally effectively corresponds to the calculation sent by the SNMP agent and if upon verification, using the public key of the SNMP agent, verifying the signature of said SNMP agent.

8. The process for verifying the preservation of the integrity of a sent request according to claim 1, characterized in that during sending of the request, the flag and the unique number, an additional piece of data is added to the request, said additional piece of data containing a marking key encrypted under a public encryption key of the server, said marking key being decryptable by the server using a corresponding private decryption key to mark the global response, and then verifying of the global response by the client.

9. The process for verifying the preservation of the integrity of a sent request according to claim 8, further comprising deciding in advance when sending a request whether or not non-duplication of the unique number is to be absolutely guaranteed by the server and adding to the request the flag specifying whether or not the server must offer said guarantee as well as the unique number formed, then performing a calculation applying the one-way compression function to the request, flag, and unique number combination, storing the calculation locally, and when the server receives the request, if the client has indicated that the server is to guarantee non-repetition, said server tests whether it can guarantee the non-repetition of the unique number, and indicating with a different flag during the response if the guarantee of non-repetition cannot be given, otherwise the server verifies whether or not said unique number has already been received and then sends an error message if the unique number has already been received, or in the opposite case, performs a calculation applying the one-way compression function to the request, flag, and unique number combination received and includes this calculation in its response, the integrity of the global response being protected by means of the key of the server, whereas the client receiving this response first verifies whether the calculation he has stored effectively corresponds to the calculation sent by the server and if this is the case, then verifies the digital signature or the mark depending on the variant used, the preservation of the integrity of the request sent previously being determined when the calculation and the integrity are verified.

10. The process for verifying the preservation of the integrity of a sent request according to claim 9, used in the case of an application in which a client who does not possess any private key desires to register the client's public key and make the client known to a server acting as a key certification authority, characterized in that the client, with knowledge of the public key of the key certification authority, sends the certification authority an unprotected request constituted by the public key to be registered, his identity, a flag and a unique number, while performing a calculation applying a one-way compression function to the entire request, storing the calculation locally, and the certification authority, upon receiving said request and verifying that the unique number has not previously been received, acknowledging receipt of said registration request and sending in response a registration number for said request and the result of a calculation performed by applying the one-way compression function to the global request received, all of which is signed with a private key of the certification authority, the client, upon receiving said response from the certification authority, verifying whether the calculation stored locally by the client effectively corresponds to the calculation sent by the server so as to verify the signature of said certification authority.

11. The process for verifying the preservation of the integrity of a sent request according to claim 9, characterized in that in an object management system using the protocol SNMP (Simple Network Management Protocol), the client is an SNMP manager and the server corresponds to an SNMP agent in order to retrieve public information while ensuring that the response returned by said SNMP agent in fact corresponds to the command contained in the request, which request includes a flag and a unique number and is sent by the SNMP manager without protection, while a calculation is then performed by applying a one-way compression function to the entire request, said calculation being stored locally, while the SNMP agent receiving the request verifies that the unique number has not already been received and upon said verification sends in response the requested information associated with the request as well as the result of the calculation performed by applying the one-way compression function to the global request received, signed with an SNMP agent signature key, then upon receiving said response, verifying by the manager whether the calculation stored locally effectively corresponds to the calculation sent by the SNMP agent and if upon verification, using the public key of the SNMP agent, verifying the signature of said SNMP agent.

12. The process for verifying the preservation of the integrity of a sent request according to claim 1, further comprising deciding in advance when sending a request whether or not non-duplication of the unique number is to be absolutely guaranteed by the server and adding to the request the flag specifying whether or not the server must offer said guarantee as well as the unique number formed, then performing a calculation applying the one-way compression function to the request, flag, and unique number combination, storing the calculation locally, and when the server receives the request, if the client has indicated that the server is to guarantee non-repetition, said server tests whether it can guarantee the non-repetition of the unique number, and indicating with a different flag during the response if the guarantee of non-repetition cannot be given, otherwise the server verifies whether or not said unique number has already been received and then sends an error message if the unique number has already been received, or in the opposite case, performs a calculation applying the one-way compression function to the request, flag, and unique number combination received and includes this calculation in its response, the integrity of the global response being protected by means of the key of the server, whereas the client receiving this response first verifies whether the calculation he has stored effectively corresponds to the calculation sent by the server and if this is the case, then verifies the digital signature or the mark depending on the variant used, the preservation of the integrity of the request sent previously being determined when the calculation and the integrity are verified.

13. The process for verifying the preservation of the integrity of a sent request according to claim 12, used in the case of an application in which a client who does not possess any private key desires to register the client's public key and make the client known to a server acting as a key certification authority, characterized in that the client, with knowledge of the public key of the key certification authority, sends the certification authority an unprotected request constituted by the public key to be registered, his identity, a flag and a unique number, while performing a calculation applying a one-way compression function to the entire request, storing the calculation locally, and the certification authority, upon receiving said request and verifying that the unique number has not previously been received, acknowledging receipt of said registration request and sending in response a registration number for said request and the result of a calculation performed by applying the one-way compression function to the global request received, all of which is signed with a private key of the certification authority, the client upon receiving said response from the certification authority, verifying whether the calculation stored locally by the client effectively corresponds to the calculation sent by the server so as to verify the signature of said certification authority.

14. The process for verifying the preservation of the integrity of a sent request according to claim 12, characterized in that in an object management system using the protocol SNMP (Simple Network Management Protocol), the client is an SNMP manager and the server corresponds to an SNMP agent in order to retrieve public information while ensuring that the response returned by said SNMP agent in fact corresponds to the command contained in the request, which request includes a flag and a unique number and is sent by the SNMP manager without protection, while a calculation is then performed by applying a one-way compression function to the entire request, said calculation being stored locally, while the SNMP agent receiving the request verifies that the unique number has not already been received and upon said verification sends in response the requested information associated with the request as well as the result of the calculation performed by applying the one-way compression function to the global request received, signed with an SNMP agent signature key, then upon receiving said response, verifying by the manager whether the calculation stored locally effectively corresponds to the calculation sent by the SNMP agent and if upon verification, using the public key of the SNMP agent, verifying the signature of said SNMP agent.

* * * * *